(12) United States Patent
Ni (10) Patent No.: US 11,196,947 B2
(45) Date of Patent: Dec. 7, 2021

(54) OPTICAL SENSOR (71) Applicant: New Imaging Technologies, Verrieres le Buisson (FR)

(72) Inventor: Yang Ni, Palaiseau (FR)

(73) Assignee: New Imaging Technologies, Verrieres le Buisson (FR)

( * ) Notice: Subject to any disclaimer, the term of this patent is extended or adjusted under 35 U.S.C. 154(b) by 42 days.

(21) Appl. No.: 16/573,165

(22) Filed: Sep. 17, 2019

(65) Prior Publication Data

US 2021/0084243 A1    Mar. 18, 2021

(51) Int. Cl.
*H04N 5/351* (2011.01)
*H04N 5/3745* (2011.01)
*H04N 5/378* (2011.01)

(52) U.S. Cl.
CPC ............ *H04N 5/351* (2013.01); *H04N 5/378* (2013.01); *H04N 5/37457* (2013.01)

(58) Field of Classification Search
CPC .......... H01L 27/14601; H01L 27/1461; H01L 27/14612; H04N 5/3575; H04N 5/3591; H04N 5/3594; H04N 5/3745; H04N 5/37455; H04N 5/378
See application file for complete search history.

(56) References Cited

U.S. PATENT DOCUMENTS

| | | | | |
|---|---|---|---|---|
| 2005/0205954 A1* | 9/2005 | King | ................. | H01L 27/14643 257/431 |
| 2006/0145202 A1* | 7/2006 | Sawase | ............... | H01L 27/1463 257/291 |
| 2007/0164333 A1* | 7/2007 | Wright | ................... | H01L 27/12 257/292 |
| 2010/0238334 A1* | 9/2010 | Takahashi | ........... | H01L 27/1469 348/305 |
| 2012/0074299 A1* | 3/2012 | Ni | ...................... | H04N 5/37452 250/208.1 |
| 2015/0122974 A1* | 5/2015 | Fowler | .............. | H01L 27/14612 250/208.1 |
| 2015/0350584 A1* | 12/2015 | Fenigstein | ............. | H04N 5/378 250/208.1 |
| 2016/0307949 A1* | 10/2016 | Madurawe | ............. | H04N 5/353 |
| 2017/0241835 A1* | 8/2017 | Do | ....................... | H01L 27/1461 |
| 2017/0359537 A1* | 12/2017 | Sakano | ................ | H04N 5/3594 |
| 2019/0281238 A1* | 9/2019 | Kalgi | ................ | H01L 27/14612 |

FOREIGN PATENT DOCUMENTS

| | | |
|---|---|---|
| FR | 2943178 A1 | 9/2010 |
| WO | 02054759 A2 | 7/2002 |
| WO | 02054759 A3 | 7/2002 |

* cited by examiner

*Primary Examiner* — Amy R Hsu
(74) *Attorney, Agent, or Firm* — Shumaker, Loop & Kendrick, LLP (57) ABSTRACT

A matrix-array optical sensor including individual detection cells each including at least one photodiode operating in photovoltaic mode, a first amplifier stage connected directly or indirectly to the photodiode and a capacitance connected directly or indirectly to the output of the first amplifier stage and the voltage of which varies with the illuminance on the photodiode, the sensor being arranged to a ensure a one-way flow of current to or from said capacitance in order to bring the latter to a voltage corresponding to an extremum of the illuminance during an operating cycle of the photodiode.

13 Claims, 7 Drawing Sheets

OPTICAL SENSOR

TECHNICAL FIELD AND BACKGROUND

The present invention relates to the optical sensors used in the manufacture of cameras, and more particularly but not exclusively to those intended for the motor-vehicle field.

Considerable effort has been made in recent years to develop autonomous vehicles.

These vehicles comprise multiple sensors that aim to recognize the environment of the vehicle, and in particular road signs, these sensors including video cameras.

Moreover, LED displays and lights have been deployed massively in recent years, in particular in road-related equipment. Generally, diodes are powered with a pulsed current, this creating, in the image of most CMOS video cameras, an undesirable fluctuation, which may adversely affect the processing of the image and the reliability of the analysis of the environment of the vehicle performed by the on-board driving system.

Logarithmic-response CMOS matrix-array sensors, comprising a plurality of individual active detection cells, also called active pixels, each comprising a photodiode operating in solar-cell mode, have already been proposed by the applicant company and in particular described in publication FR 2 943 178.

The logarithmic response of each individual detection cell is based on the fact that, in photovoltaic operation, the photodiode generates a negative voltage in open circuit the absolute value of which is substantially proportional to the logarithm of the level of illuminance on the photodiode.

In these known sensors, a reset transistor allows a short-circuit to be created in the photodiode in order to simulate a dark condition at the start of the acquisition cycle. A differential read-out between the voltage generated by the photodiode in open circuit and the voltage generated in short circuit allows additive offset noise to be suppressed and thus a clean image to be obtained.

In the sensor that is the subject of the publication FR 2 943 178, each individual detection cell comprises two amplification stages, a sampling transistor between the first and second amplifying stages and a capacitance at the output of the first amplifier stage in order to store the value of the voltage. The presence of the sampling transistor and the fact that the voltage delivered by the photodiode as output from the first amplifier stage is stored in said capacitance may allow the time delay induced by a gradual read-out of the rows of the sensor to be decreased, and the deformation in the image of a moving object observed using the sensor to be avoided or at least attenuated.

This sensor performs well in terms of capture of an image of moving objects but does not allow the problem of fluctuation in the image in the presence of a pulsed light source to be solved.

SUMMARY

The invention thus aims to provide a solution to the problem of fluctuation in the image of LED lights or displays powered with a pulsed current, and relates to a matrix-array optical sensor comprising individual detection cells each comprising at least one photodiode operating in photovoltaic mode, a first amplifier stage connected directly or indirectly to the photodiode and a capacitance connected directly or indirectly to the output of the first amplifier stage and the voltage of which varies with the illuminance on the photodiode, the sensor being arranged to ensure a one-way flow of current to or from said capacitance in order to bring the latter to a voltage corresponding to an extremum of the illuminance during an operating cycle of the photodiode.

The expression "A connected directly to B" must be understood to mean that a terminal of A is connected to a terminal of B by an electrical conductor. The expression "A connected indirectly to B" must be understood to mean that A is connected to B by way of a component or of an electronic circuit. In the absence of precision as to the direct or indirect nature of the connection, the latter must be considered to be direct or indirect.

The one-way flow of current may be between said capacitance and the first stage.

The matrix-array sensor according to the invention has a logarithmic response at least at high light intensities, i.e. in at least one operating range of the sensor, in particular at high light intensities, the electrical response of the sensor as a function of light intensity is logarithmic. This logarithmic response results from the photovoltaic-cell operating mode of the photodiode, which is different from the operating mode of conventional CMOS sensors, which do not have this logarithmic response.

Since a voltage that corresponds to an extremum of the illuminance is stored in the capacitor, each pixel is able to store the peak illuminance related to the turn on of the LED lighting powered with pulsed current; thus, an image that no longer fluctuates is obtained, contrary to the prior art.

There are at least two ways according to the invention of storing the peak illuminance.

The first solution is preferred, because it allows the structure of the individual detection cells of existing sensors to be preserved, only the electronic circuits generating the command signals of the various transistors of the individuals detection cells needing to be modified, this modification possibly, in certain cases, being made by means of software.

Thus, according to a first example of implementation of the invention, the sensor is arranged to bring the capacitance to a predefined voltage at the start of the operating cycle, so as allow this voltage to then vary, provided that the difference between the voltage of the capacitance and the voltage of the photodiode is larger than a given threshold.

This predefined voltage may be a high voltage or a low voltage depending on the way in which the photodiode is connected to the rest of the circuit.

The first amplifier stage may comprise a first transistor the gate of which is connected to the photodiode and a biasing second transistor, and the sensor may be arranged to command the latter at the start of the operating cycle so as to bring the capacitance to a predefined potential. The bias delivered by the second transistor is thus transitory.

The first stage may be a buffer stage.

The second transistor may be commanded via a signal (Bias) the value of which, to turn the second transistor on, is set to a value intermediate between ground potential and the supply Vdd.

In examples in which the transistor of the individual detection cell the gate of which is connected to the photodiode is of PMOS type, the capacitance will discharge through the transistor; in examples in which this transistor is of NMOS type, the capacitance will charge through the transistor.

In a second example of implementation of the invention, which requires modifications to the structure of the individual detection cells of the existing sensors, the sensor is arranged to bring the capacitance to a predefined potential at the start of the operating cycle, and each individual detection cell comprises a diode connecting the first amplifier stage to the capacitance so as to cause the capacitor to charge or discharge through the diode during the operating cycle.

Each individual detection cell may also comprise a transistor for resetting the charge of the capacitance downstream of the diode, the sensor being arranged to command this transistor at the start of the operating cycle to bring the capacitance to said predefined potential.

In such an example with presence of a diode connecting the first transistor of the first stage to the capacitance, the bias delivered by the second transistor of the first stage is preferably permanent.

Irrespectively of whether it is a question of the first or second example of implementation, said capacitance may consist of the parasitic capacitance of a transistor of a second amplifier stage that receives as input the output of the first stage. It is nevertheless preferable for the capacitance to be at least partially defined by a specific capacitor, this making it possible to achieve a higher capacitance, and to carry out a read-out later despite the natural discharge of the capacitance because of leakage currents.

The sensor may comprise a sampling transistor between the first and second amplifier stages, allowing, when open, the second amplifier stage to be isolated from the first. This may allow the illuminance to be stored at the same time for all the pixels of the matrix array, this being advantageous in case of acquisition of the image of a moving scene.

The photodiode may be produced either by doping a p-type substrate n-type or by doping a n-type substrate p-type. The photovoltaic voltage generated by the photodiode is always positive from the anode to the cathode. Depending on the arrangement of the photodiode in the read circuit, it is possible to obtain a voltage that varies positively or negatively with light intensity. Depending on the circumstances, it is the anode or the cathode of the photodiode that is connected to a set voltage.

The sensor may be "hybrid", i.e. comprise a circuit for reading the voltages of the photodiodes, which is located on a substrate that is placed under the substrate comprising the photodiodes, with respect to incident light, and that is connected thereto by electrical connections.

Yet another subject of the invention is a method for acquiring an image by means of a matrix-array optical sensor, in particular such as defined above, this sensor comprising individual detection cells each comprising at least one photodiode, a first amplifier stage connected directly or indirectly to the photodiode and a capacitance connected directly or indirectly to the output of the first amplifier stage, method wherein, in an operating cycle, the photodiode operates in photovoltaic mode and the voltage across the terminals of the capacitance varies with the illuminance on the photodiode, and wherein the sensor is arranged to ensure a one-way flow of current between the first stage and said capacitance in order to bring the latter to a voltage corresponding to an extremum of the illuminance during an operating cycle of the photodiode.

The features described above with regard to the sensor apply to this method.

In particular, in one preferred example of implementation of the invention, a signal is applied to the gate of a biasing transistor of the first stage in order to turn said transistor on and to bring the potential of said capacitance to a predefined value before the exposure, this signal then being deactivated during the exposure, the biasing transistor being turned off.

The capacitance may discharge or charge through a transistor of the first stage, the gate of which is connected to the cathode or anode of the photodiode, respectively.

In one example of implementation, the two transistors of the first stage are connected in series, the drain of the biasing transistor being connected to the source of the transistor the gate of which is connected to the cathode of the photodiode. The source of the biasing transistor is connected to the high supply terminal, the drain of the other transistor to ground, and likewise the anode of the photodiode. The transistors are of PMOS type in this example.

BRIEF DESCRIPTION OF THE DRAWINGS

The invention may be better understood on reading the following detailed description of nonlimiting examples of implementation thereof, and on examining the appended drawings, in which.

DETAILED DESCRIPTION

Figure 1:
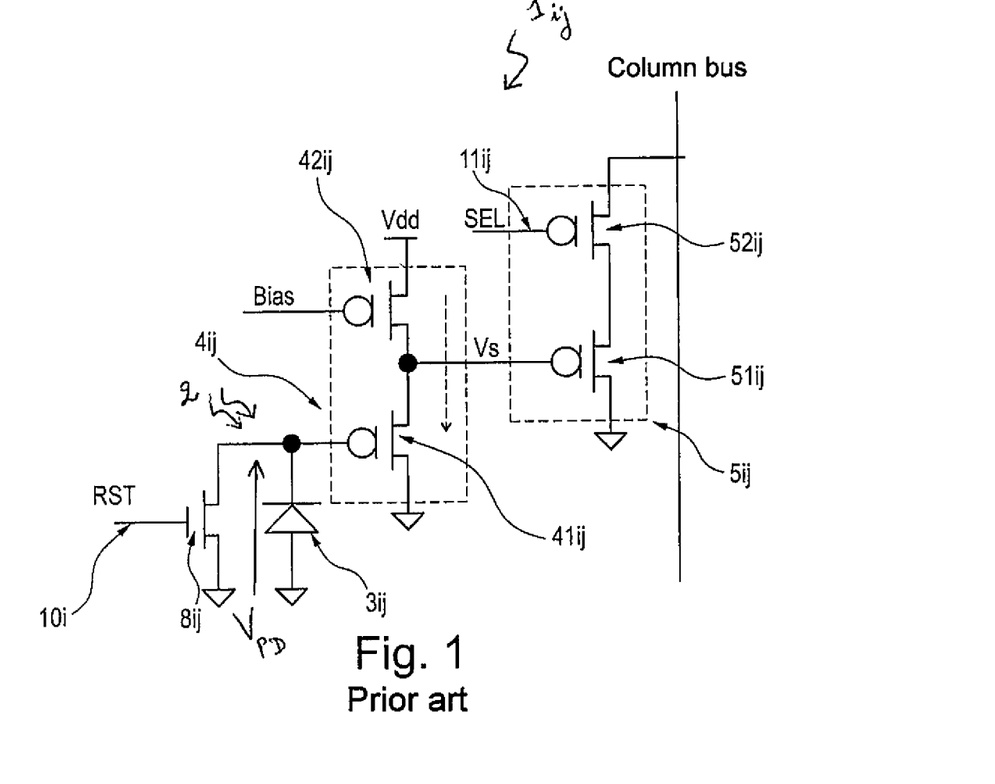
FIG. 1 is a circuit diagram of an individual detection cell of a known sensor.

FIG. 1 shows a known individual detection cell $1_{ij}$ forming a pixel of the sensor. Preferably, the sensor is a matrix-array sensor, and this cell thus forms part of a matrix array of pixels made up of n rows and p columns, the indices i and j corresponding to the row number and to the column number, respectively. For example, n is higher than or equal to 240 and p is higher than or equal to 320.

Each individual detection cell $1_{ij}$ comprises a photodiode $3_{ij}$ having at least one operating range in solar-cell mode, and a first amplifier stage $4_{ij}$ and a second amplifier stage $5_{ij}$. The photodiode $3_{ij}$ has its anode connected to ground, as illustrated.

The photodiode $3_{ij}$ is for example produced using a p-n junction between two types of semiconductor material allowing the photoelectric conversion.

A transistor $8_{ij}$ allows, as described in patent EP 1 354 360, the photodiode $3_{ij}$ to be short-circuited in order to simulate a condition of absolute darkness. This transistor $8_{ij}$ for example has its source connected to a source of predefined potential, which may be ground, and its drain connected to the cathode of the photodiode $3_{ij}$.

The gate of the transistor $8_{ij}$ is connected to a zeroing bus $10_i$ that applies a signal RST at the start of each operating cycle.

It is possible to initialize the photodiode to a zero voltage or to a reverse-bias voltage, in order to obtain a range of linear operation at low illuminances.

The first amplifier stage $4_{ij}$ receives as input the voltage induced in the photodiode $3_{ij}$ when the latter is subjected to an illumination, at least in the operating range in solar-cell mode of the photodiode.

The output of the first amplifier stage $4_{ij}$ is received as input by the second amplifier stage $5_{ij}$ and the output of this second amplifier stage $5_{ij}$ is read via a column-read bus $7_j$ that is common to a plurality of detection cells $1_{ij}$ associated with pixels of a given column j of the sensor.

The first amplifier stage $4_{ij}$ comprises, in the described example, two p-channel MOS field-effect transistors $41_{ij}$ and $42_{ij}$ in series, the transistor $42_{ij}$ being supplied with a high voltage $V_{dd}$.

The gate of the transistor $42_{ij}$ is connected to a voltage bus Bias that allows the bias current of the first amplifier stage $4_{ij}$ to be adjusted. This signal Bias remains constant, in the prior art, during the operating cycle of the detection cell $1_{ij}$. The cathode voltage of the photodiode $3_{ij}$ is applied to the gate of the transistor $41_{ij}$.

The second amplifier stage $5_{ij}$ comprises, in the illustrated example, first and second field-effect transistors $51_{ij}$ and $52_{ij}$, which are p-channel MOS transistors.

The transistor $52_{ij}$ plays the role of a transistor for selecting row i, the gate of which is connected to a SEL command bus $11_i$.

When the photodiode $3_{ij}$ is subjected to an illumination 2, a negative voltage $V_{pd}$ is generated between the terminals of the p-n junction and this voltage is read by the first amplifier stage $4_{ij}$, which is kept operating permanently by virtue of the bias current.

The voltage Vs output from this first amplifier stage $4_{ij}$ is received as input by the second amplifier stage $5_{ij}$, via the gate of the transistor $51_{ij}$.

The read-out of the pixel associated with the individual detection structure $1_{ij}$ is achieved through the second amplifier stage $5_{ij}$.

The second amplifier stage $5_{ij}$ is biased only when the pixel $1_{ij}$ is selected with a view to being read out. In the absence of such a selection, the selection transistor $52_{ij}$ not turned on.

When the pixel $1_{ij}$ is selected, the selection transistor $52_{ij}$ is activated by way of the transmission of an activation signal via the SEL bus $11_i$, and a bias current allowing this transistor $52_{ij}$ to be turned on in order to read the pixel is sent to the second amplifier stage $5_{ij}$.

The circuits for reading pixels and for selecting row and column are known, per se, and described for example in the publication FR 2 943 178.

Figure 2:
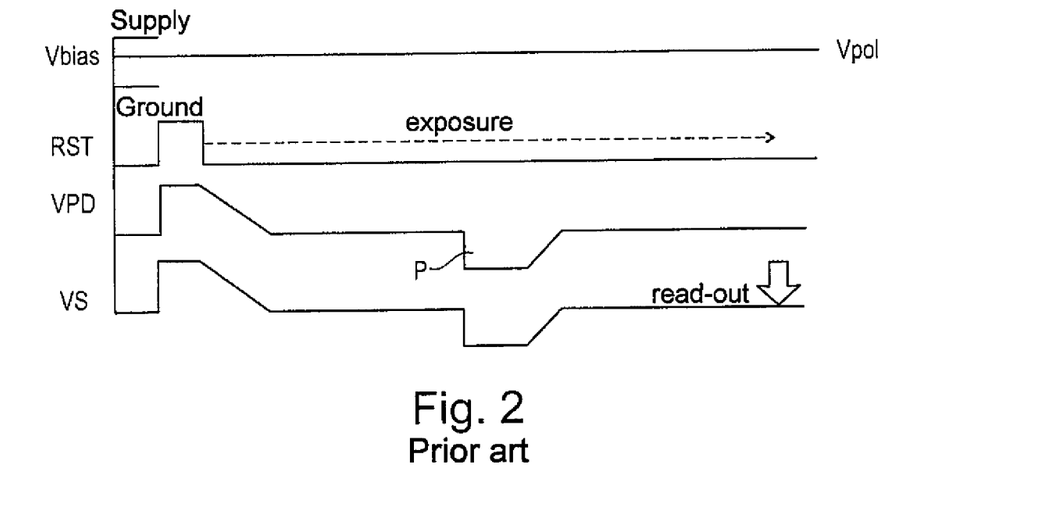
FIG. 2 is a timing diagram of the command signals of the various transistors of the cell of FIG. 1.

FIG. 2 shows the various command signals RST and Bias and the voltage Vpd of the photodiode and the voltage Vs output from the first stage.

Such a prior-art sensor has the drawback of producing a fluctuating image in the presence of LED lighting supplied with a pulsed current, because the voltage of the photodiode $3_{ij}$ varies during the exposure time because of the pulsed nature of the current, and, in case of a voltage peak P across the terminals of the photodiode, i.e. a peak related to the turn on of the lighting at the start of the exposure time for example, this voltage then varies after turn off of the lighting, and may return to a level that existed before the lighting was turned on, as illustrated in FIG. 2, depending on the lapse of time that separates the turn on of the light and the end of the exposure time.

It may also be seen in FIG. 2 that the command voltage Vbias is constant and equal to a value Vpol that is intermediate between zero volts (ground) and +Vdd (the supply).

The invention allows the peak amplitude related to the turn on of the lighting to be stored until the end of the exposure time, even if the voltage across the terminals of the photodiode decreases, in absolute value, after the turn off of the lighting.

The invention proposes two ways of achieving this.

Figure 3:
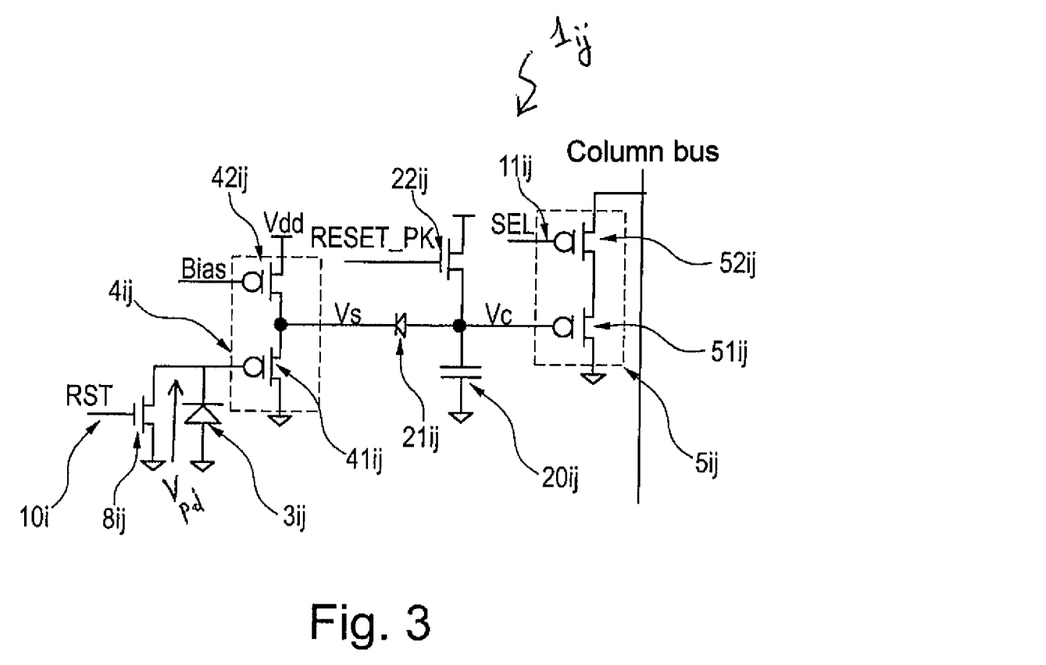
FIG. 3 is a view analogous to FIG. 1 of a detection cell according to a first example of implementation of the invention.
Figure 4:
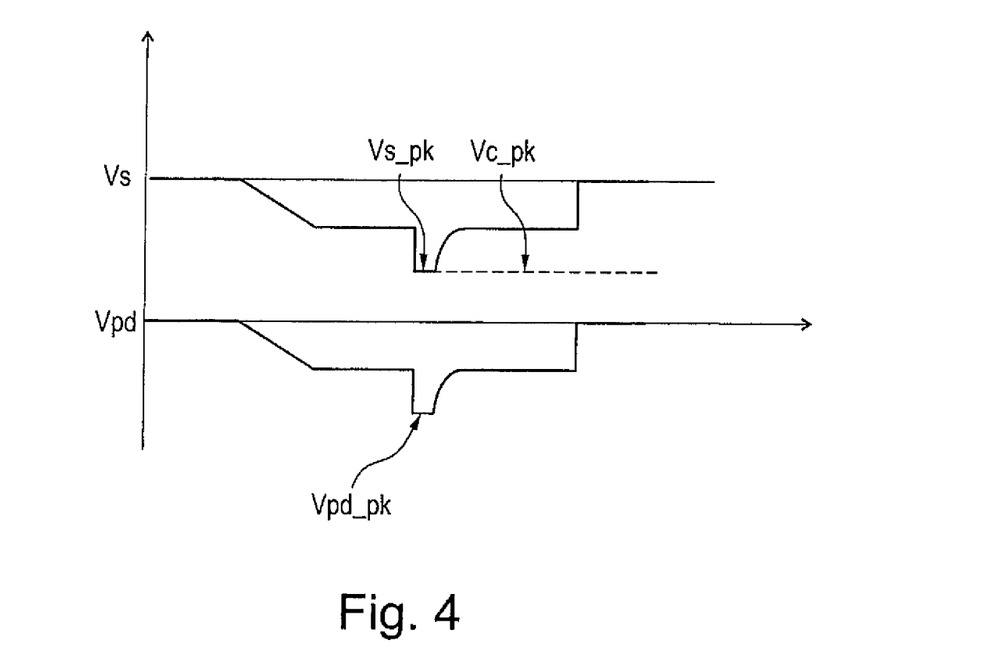
FIG. 4 illustrates the variation in the voltages across the terminals of the photodiode and of the capacitance for storing the illumination over time, during an operating cycle of the sensor.
Figure 5:
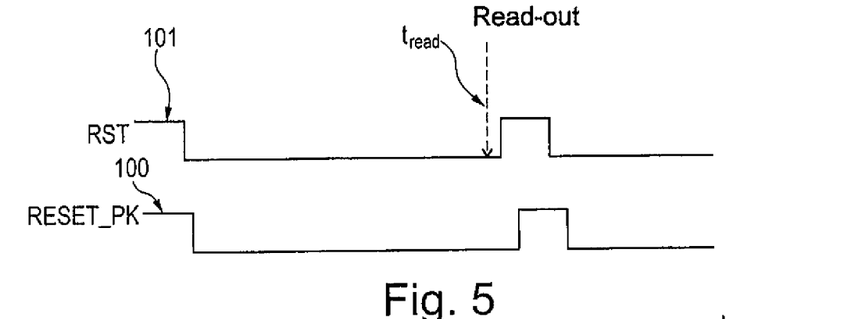
FIG. 5 is a timing diagram of the reset signals.

In the first example of implementation of the invention, which example is illustrated in FIGS. 3 to 5, each pixel $1_{ij}$ of the matrix-array sensor has some of the structure of the individual detection cell described with reference to FIG. 1. The elements that are the same have been given the same reference numbers and will not be described again in detail.

Unlike the diagram of FIG. 1, the second stage $5_{ij}$ is connected to the first stage $4_{ij}$ by way of a diode $21_{ij}$ the cathode of which is connected to the output of the first stage $4_{ij}$, and a capacitance $20_{ij}$ is placed between the anode of the diode $21_{ij}$ and ground.

A charging transistor $22_{ij}$ connects the positive terminal $V_{dd}$ of the supply and the capacitance $20_{ij}$ in order to charge the latter to a high potential when a zeroing signal RESET_PK is sent to the gate of the transistor $22_{ij}$ in order to turn it on. The capacitance $20_{ij}$ has its terminal opposite the terminal connected to the anode of the diode $21_{ij}$ connected to a set voltage, ground for example. Specifically, it is possible, as mentioned above, to initialize the photodiode to a zero voltage or to a reverse-bias voltage, in order to obtain a range of linear operation at low illuminances.

The output voltage Vs of the first stage $4_{ij}$ follows the variation in the voltage $V_{pd}$ of the photodiode, which is negative, as illustrated in FIG. 4.

The voltage Vc across the terminals of the capacitance $20_{ij}$, which is represented by a dashed line in this figure, follows the variation in the output voltage Vs provided that the latter is lower than the voltage across the terminals of the capacitance. Thus, the voltage across the terminals of the capacitance $20_{ij}$ decreases to a peak value $Vs_{pk}$ of the output voltage, which corresponds to a peak value $V_{pdPK}$ of the voltage across the terminals of the photodiode $3_{ij}$.

In contrast, the voltage Vc is prevented from rising, by the presence of the diode $21_{ij}$, past the illumination peak responsible for the peak value $V_{pdPK}$.

Thus, a peak voltage $Vc_{PK}$, which is representative of the peak voltage $V_{pdPK}$ of the photodiode $3_{ij}$, may be stored in the capacitance $20_{ij}$.

This peak voltage $Vc_{PK}$ corresponds to a maximum of the intensity of the light received, at the time at which the one or more light sources present in the field of view of the sensor are turned on.

The optical sensor according to this first example of implementation of the invention may thus store the maximum light intensity received by each pixel during the exposure time.

Where appropriate, the capacitance $20_{ij}$ may consist of the parasitic capacitance between the gate and the source of the transistor $51_{ij}$. It is however preferable to make provision for a specific capacitor, in order to obtain a higher capacitance and to be able to delay the time of read-out, allowing for inevitable leakage currents.

In each read cycle, it is possible, as illustrated in FIG. 5, using a pulse 100 of the signal RESET_PK sent to the gate of the transistor $22_{ij}$, to reset the charge of the capacitance $20_{ij}$ to a sufficiently high value to then lead to a discharge during the exposure time, and to read, at the end thereof, at the time $t_{read}$, the value of the voltage across the terminals of this capacitance, which is representative of the maximum illuminance received by the photodiode $3_{ij}$. In FIG. 5, the signal RST 101 applied to the transistor $8_{ij}$ to reset the photodiode at the start of an operating cycle of the pixel may also be seen.

The embodiment of FIG. 3 has the drawback of requiring the presence of additional components with respect to the known sensor illustrated in FIG. 1, namely, for each detection cell, the diode $21_{ij}$ and the reset transistor $22_{ij}$ (assuming that the capacitance $20_{ij}$ consists of the parasitic capacitance of the transistor $51_{ij}$).

Figure 6:
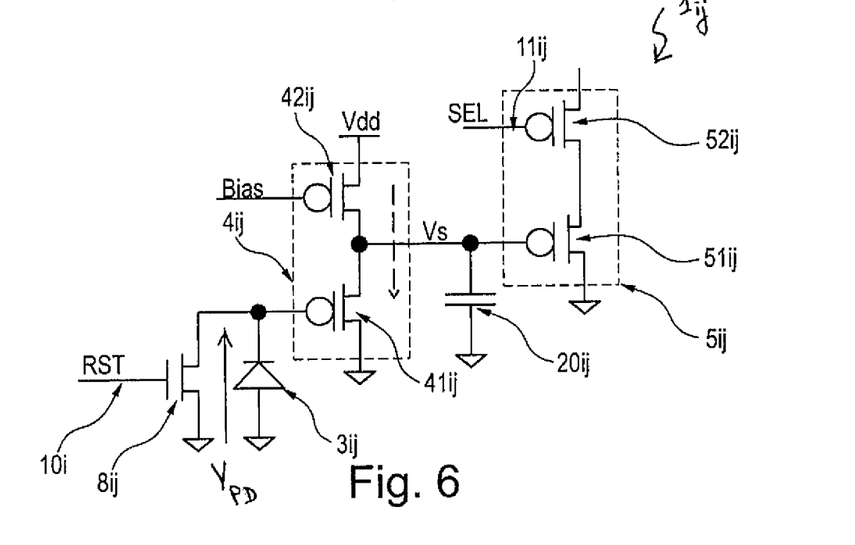
FIG. 6 is a circuit diagram of an individual detection cell of a sensor according to a second example of implementation of the invention.
Figure 7:
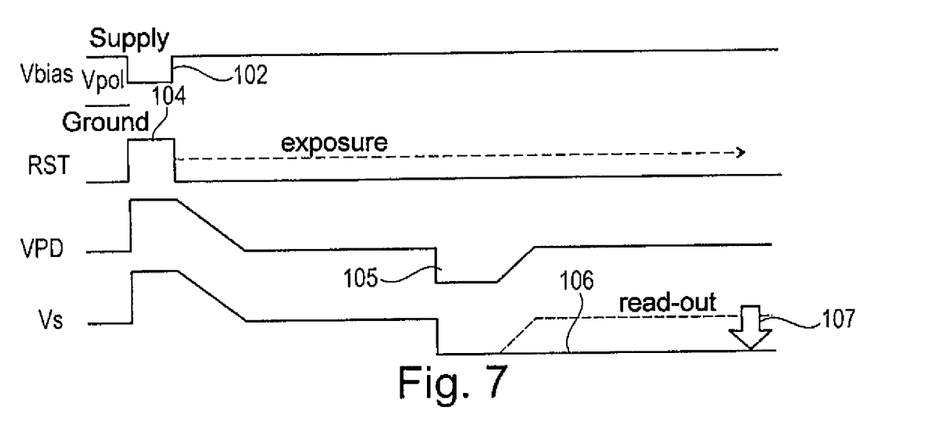
FIG. 7 is a timing diagram of the command signals of the transistors of the individual detection cell of FIG. 6.
Figure 8:
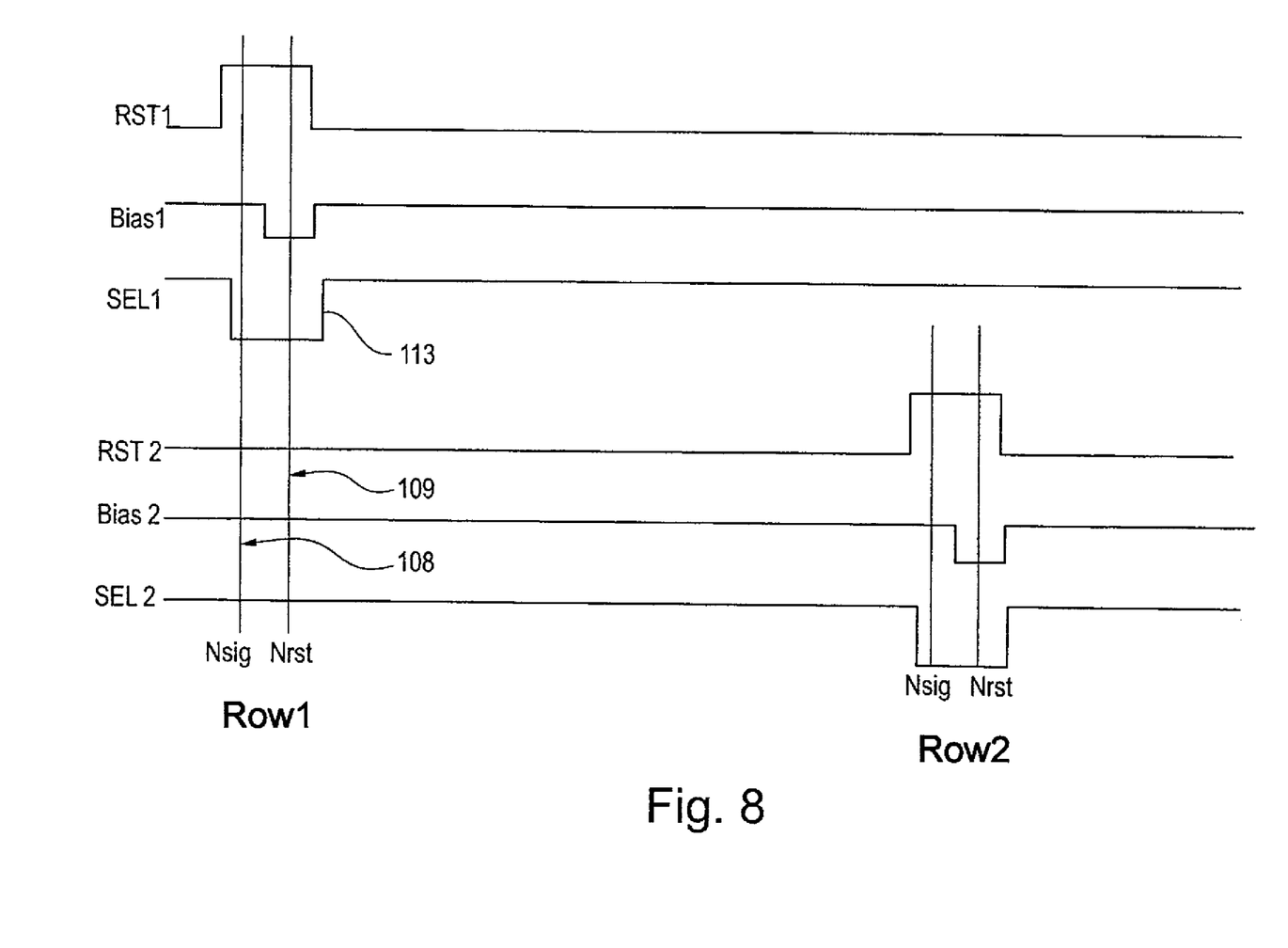
FIG. 8 is an example of a timing diagram of signals for the read-out of the pixels of the sensor comprising individual detection cells such as that of FIG. 6.

With reference to FIGS. 6 to 8, a second embodiment of the sensor according to the invention, which has the advantage of not requiring the addition of additional components to the detection cell $1_{ij}$ (assuming that the capacitance $20_{ij}$ consists of the parasitic capacitance of the transistor $51_{ij}$), will now be described.

Provision has however been made, in FIG. 6, for a specific capacitor to at least partially define the capacitance 20*ij* that stores the value to be read.

The logic for commanding the bias voltage Bias of the first stage is modified, as illustrated in FIG. 7, in order to turn the transistor $42_{ij}$ on (pulse 102 in FIG. 7) and to bring the output Vs to a high-voltage, at the start of an operating cycle. The transistor $42_{ij}$ may be activated simultaneously to the transistor $8_{ij}$.

The pulse 102 of the signal Bias preferably occurs during the reset period of the photodiode (pulse 104), as illustrated, and allows the voltage Vs to be returned to its high state. This pulse 102 may also occur before the pulse 104 of the signal RST.

It may be seen, by comparing FIGS. 2 and 7, that in the prior art the voltage of the signal Bias remains constant at a bias value Vpol, whereas in the invention the voltage of the signal Bias varies during an operating cycle, taking the value Vpol only during the pulse 102, and taking a set value that makes the transistor 42*ij* inactive outside of the pulse 102, namely a high-voltage equal to Vdd in the example in question.

During the exposure time, the signal Bias is deactivated (i.e. set to a level that deactivates the transistor 42*ij*). The output voltage Vs stabilizes to a value that depends on the luminance received by the photodiode, as illustrated in FIG. 7. The current in the transistor $41_{ij}$ between the drain and the source can flow only in the direction that discharges the capacitance $20_{ij}$, and this one-way flow stops when the gate-source voltage $V_{gs}$ of this transistor reaches the threshold voltage of this transistor.

The gate voltage of the transistor being $V_{pd}$, it may be seen that, when $V_{pd}$ exhibits a peak 105, related to the fact that the incident light is pulsed, the voltage Vs may decrease further and reach a new minimum 106. The form that the voltage Vs would have had in the prior art after the peak 105 has been shown by a dashed line in FIG. 7.

In the invention, when $V_{pd}$ increases again, after the end of the light pulse, Vs cannot increase because the voltage across the terminals of the capacitance $20_{ij}$ has become lower. In this way a peak voltage that follows the variation in the decrease of the voltage across the terminals of the photodiode $3_{ij}$ may be stored in the capacitance $20_{ij}$. This voltage may be read, at the end of the exposure time, 107, then the operating cycle may start again.

FIG. 8 illustrates an operating mode in which a sequential read-out of the useful-signal level Nsig and of the dark signal level Nrst of the pixels of the matrix array is carried out row-by-row. In this example, the read-out is initiated, 108, by activating, 113, the signal SEL1, just after the reset of the pixel of row 1 with the signal RST1. The value of the dark level Nrst is read, 109. It is then possible to find the difference between the read values Nrst and Nsig. It may be seen, in FIG. 8, that the signal Bias1 for row 1 may be activated during the read-out of the dark level Nrst, whereas it is not activated during the read-out of the useful-signal level Nsig.

This operation allows the dark level Nrst of the pixel to be read but also Vs to be returned to its high level, armed for the peak detection of the following image.

The same is subsequently done for the following rows, sequentially. In FIG. 8, the signals RST2, Bias2 and SEL2 have been shown.

Figure 9:
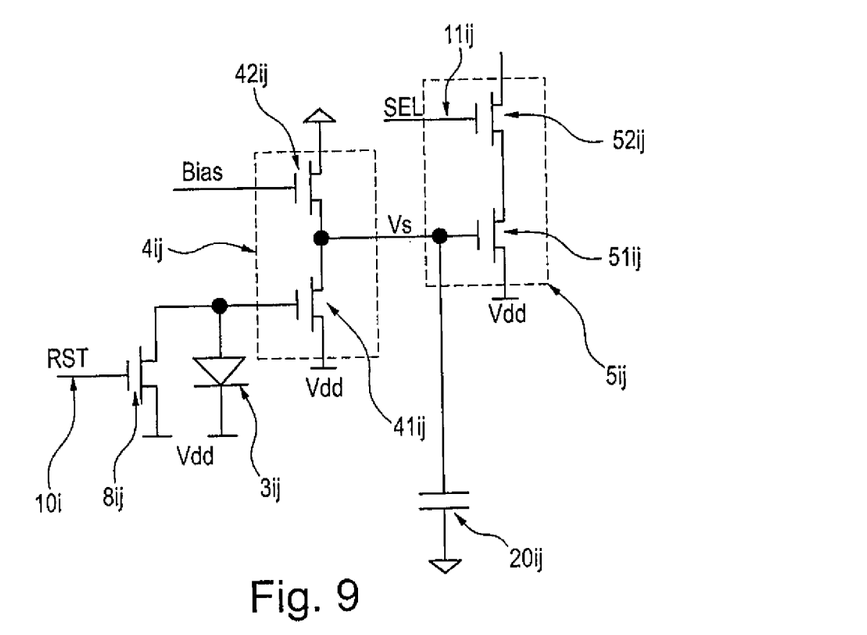
FIG. 9 is a diagram analogous to FIG. 6 of a variant individual detection cell.

The sensor may comprise a sampling transistor between the first and second stages, this transistor being commanded via a signal Sample.

Figure 10:
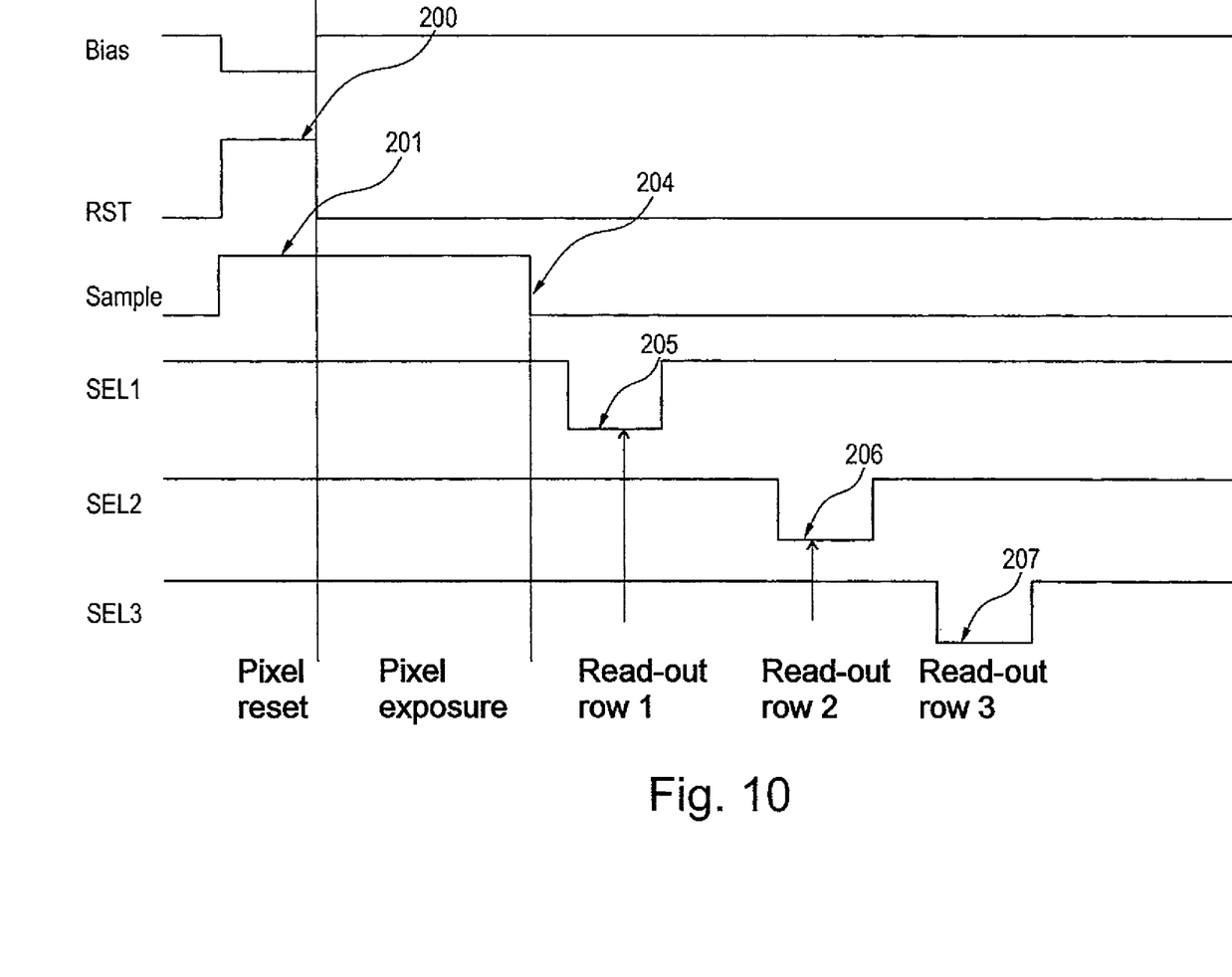
FIG. 10 is an example of a timing diagram of signals for the read-out of pixels of a sensor comprising individual detection cells such as that of FIG. 9.

FIG. 10 shows the various command signals of such a sensor.

To start with, the pixels are reset, 200. The signal RST is activated is, as is the signal Bias. The sampling transistor is turned on via activation, 201, of the signal Sample for a predefined time, the time interval between the falling front of the pulse RST and the falling front of the pulse Sample corresponding to the exposure time.

The signal Sample is simultaneously deactivated, 204, for all the pixels of the various rows, then the row-by-row read-out is carried out by virtue of the successive activation of the signals SEL1, SEL2, SEL3, in steps 205, 206, 207, respectively.

Of course, the invention is not limited to the examples that have just been described. It is for example possible to use NMOS transistors to form the first and second amplifier stages, and to invert the way in which the photodiode $3_{ij}$ is mounted.

Figure 11:
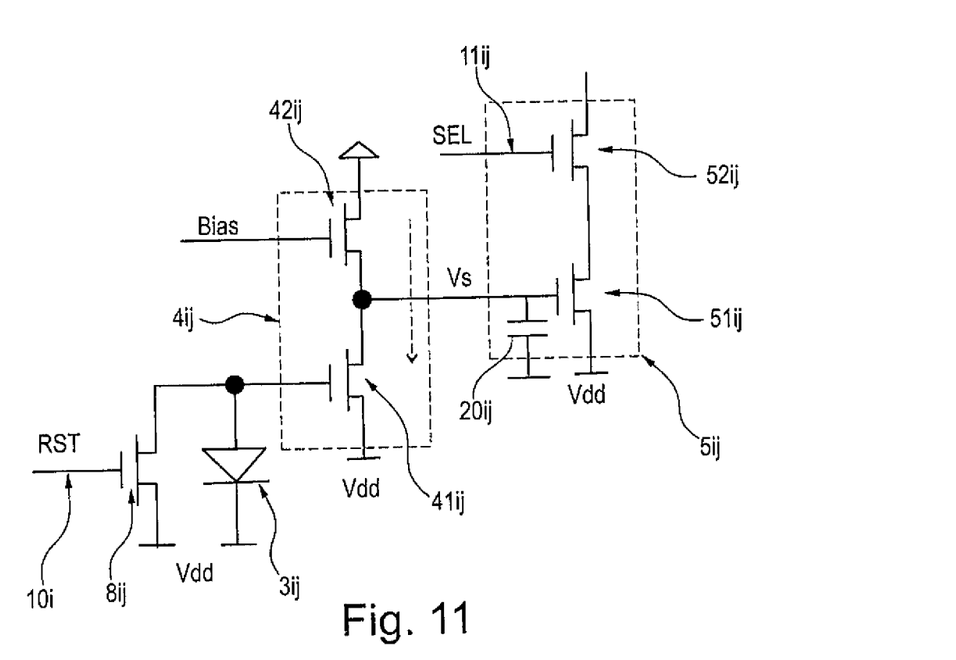
FIG. 11 is a view analogous to FIG. 6 of a variant embodiment of the individual detection cell.

By way of example, FIG. 11 illustrates such an individual detection cell.

In this case, the signal Bias remains at 0 outside of the pulse 102. The voltage Vs increases with the illuminance on the photodiode, and the capacitance $20_{ij}$ charges (Vs increases from a negative initial value) through the transistor $41_{ij}$ provided that the voltage difference between the voltage of the photodiode and the voltage of the capacitance remains larger than a given threshold.

Figure 12:
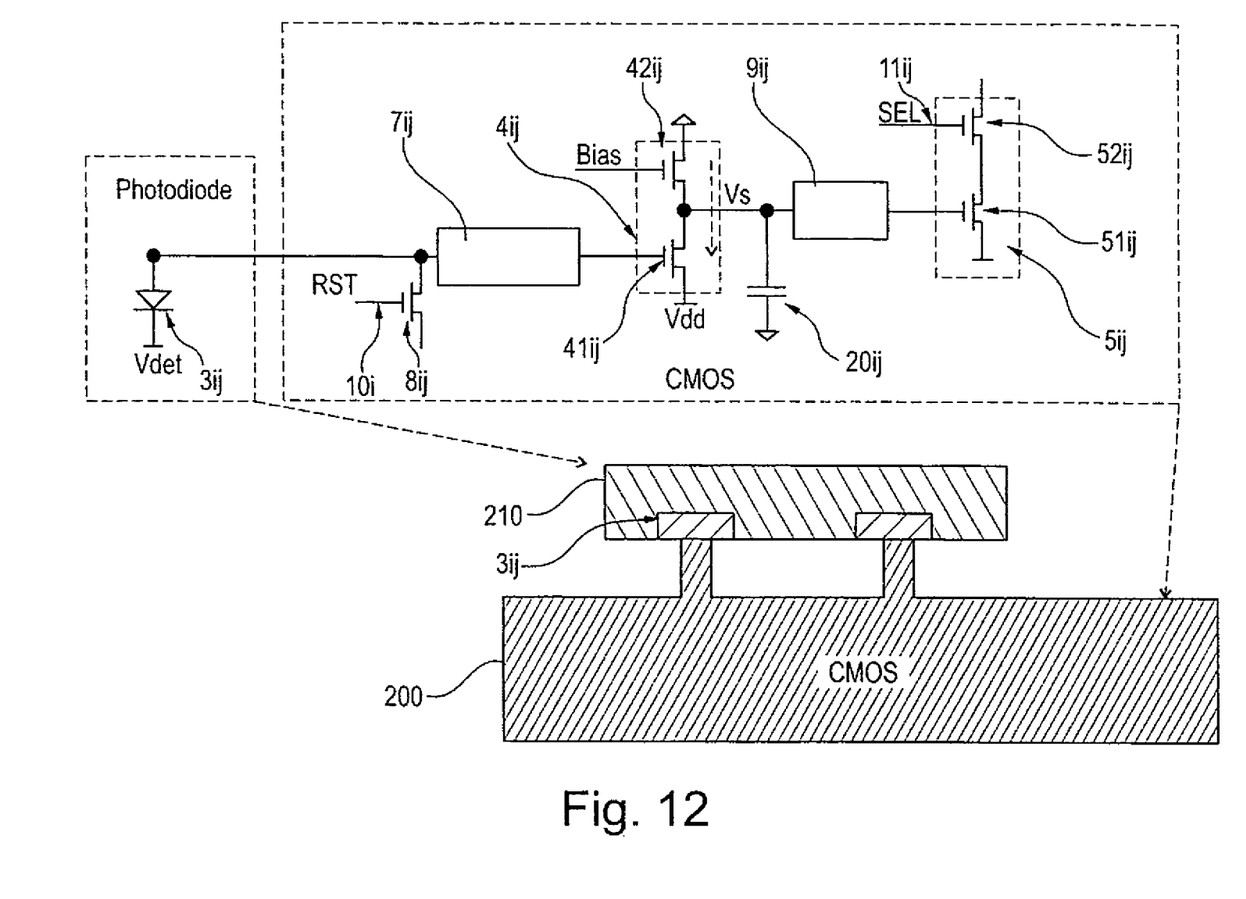
FIG. 12 shows a so-called "hybrid" pixel, according to one variant of implementation of the invention.

FIG. 12 illustrates the ability to produce the pixel in a hybrid form, with a CMOS read circuit 200 surmounted by a substrate 210 within which the photodiodes 3*ij* of each pixel are produced. The substrate of the read circuit 200 is common to a plurality of pixels.

The anode of each photodiode $3_{ij}$ is for example set to a set potential (during the operation of the photodiode) Vdet.

Such an arrangement creates more space in the read circuit 200 for additional components, and in particular for, between the photodiode and the gate of the transistor $41_{ij}$, a processing circuit $7_{ij}$, which may be for example be used for amplification.

Likewise, it is possible to insert, between the output of the stage $4_{ij}$ and the selection stage $5_{ij}$, an electronic circuit $9_{ij}$, which may be varied.

In the example of FIG. 12, the photodiode is thus indirectly connected to the gate of the transistor $41_{ij}$ and the output of the first stage $4_{ij}$ is indirectly connected to the input of the stage $5_{ij}$.

The capacitance $20_{ij}$ is connected to the output of the first stage, upstream of the circuit $9_{ij}$.

It is also possible to use so-called depletion-mode CMOS transistors.

The expression "comprising a" must be understood to be synonymous with "comprising at least one", unless otherwise specified.

The invention claimed is:

1. A matrix-array optical sensor comprising individual detection cells each comprising at least one photodiode operating in photovoltaic mode, a first amplifier stage connected directly or indirectly to the photodiode and a capacitance connected directly or indirectly to the output of the first amplifier stage and the voltage of which varies with the illuminance on the photodiode, the sensor being arranged to a ensure a one-way flow of current to or from said capacitance in order to bring the latter to a voltage corresponding to an extremum of the illuminance during an operating cycle of the photodiode.

2. The sensor as claimed in claim 1, being arranged to bring the capacitance to a predefined voltage at the start of the operating cycle, so as to allow this voltage to then vary provided that the difference between the voltage of the capacitance and the voltage of the photodiode is larger than a given threshold.

3. The sensor as claimed in claim 2, being arranged to bring the capacitance to a high or low voltage at the start of the operating cycle, so as to allow it to then discharge to or charge from the first amplifier stage provided that the difference between the voltage of the capacitance and the voltage of the photodiode is larger than a given threshold, respectively.

4. The sensor as claimed in claim 2, the first amplifier stage comprising a first transistor the gate of which is connected to the photodiode and a biasing second transistor, the sensor being arranged to command the latter at the start of the operating cycle so as to bring the capacitance to the predefined voltage.

5. The sensor as claimed in claim 4, the second transistor being commanded by a signal the value of which, to turn the second transistor on, is set to a value intermediate between ground and the supply Vdd.

6. The sensor as claimed in claim 1, being arranged to bring the capacitance to a predefined potential at the start of the operating cycle, and comprising a diode connecting the first amplifier stage to the capacitance so that the capacitance charges or discharges through the diode during the operating cycle.

7. The sensor as claimed in claim 6, comprising a transistor for resetting the charge of the capacitance downstream of said diode, the sensor being arranged to command this transistor at the start of the operating cycle in order to bring the capacitance to said predefined potential.

8. The sensor as claimed in claim 1, said capacitance being defined at least partially by a specific capacitor.

9. The sensor as claimed in claim 1, comprising a sampling transistor between the first amplifier stage and a second amplifier stage, allowing when open the second amplifier stage to be isolated from the first.

10. The sensor as claimed in claim 1, comprising a circuit for reading the voltages of the photodiodes, which is located on a substrate that is placed under the substrate comprising the photodiodes, with respect to the incident light, and that is connected thereto by electrical connections.

11. A method for acquiring an image by means of a matrix-array optical sensor, this sensor comprising individual detection cells each comprising at least one photodiode, a first amplifier stage connected directly or indirectly to the photodiode and a capacitance connected directly or indirectly to the output of the first amplifier stage, method wherein, in an operating cycle, the photodiode operates in photovoltaic mode and the voltage across the terminals of the capacitance varies with the illuminance on the photodiode, and wherein the sensor is arranged to ensure a one-way flow of current between the first amplifier stage and said capacitance in order to bring the latter to a voltage corresponding to an extremum of the illuminance during an operating cycle of the photodiode.

12. The method as claimed in claim 11, wherein a signal is applied to the gate of a biasing transistor of the first amplifier stage in order to turn said transistor on and to bring the potential of said capacitance to a predefined value before the exposure, this signal then being deactivated during the exposure, the biasing transistor being turned off.

13. The method as claimed in claim 12, the capacitance discharging or charging through a transistor of the first stage, the gate of which is connected to the cathode or anode of the photodiode, respectively.

* * * * *